(No Model.)
W. HOLLINGSWORTH & H. R. TRAVERS.
PEA SHELLER.
No. 390,125. Patented Sept. 25, 1888.
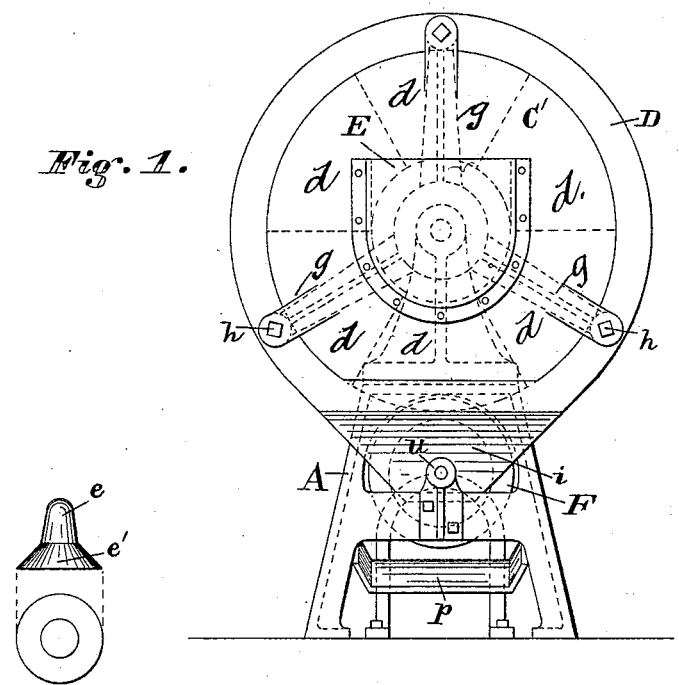
Fig. 1.
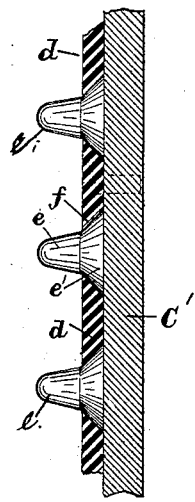
Fig. 4.
Fig. 3.
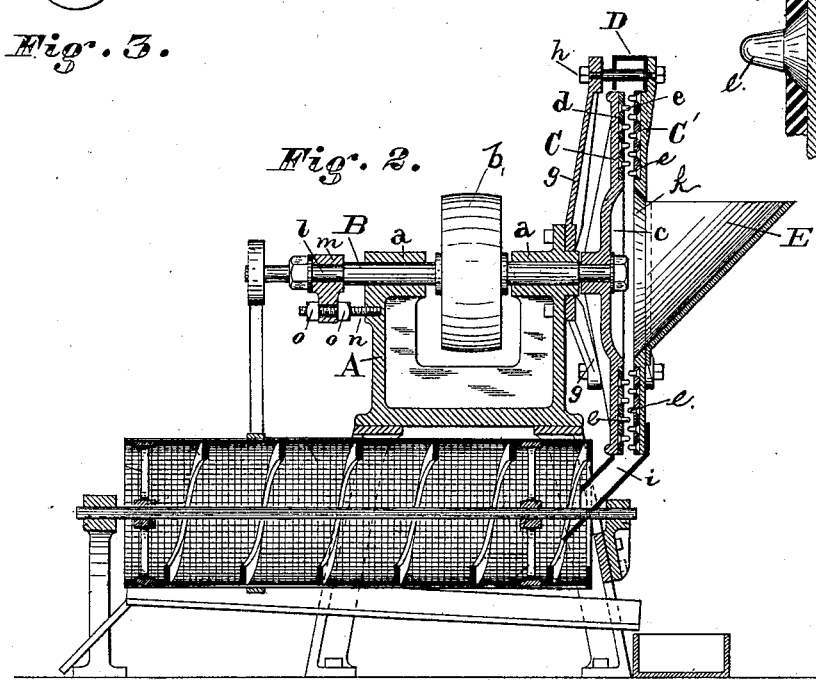
Fig. 2.
WITNESSES:
J. K. E. Diffenderffer.
John E. Morris.
INVENTORS:
Wm Hollingsworth
H. R. Travers
BY Chas B. Mann
ATTORNEY.
N. PETERS. Photo-Lithographer, Washington, D. C.

UNITED STATES PATENT OFFICE.

WILLIAM HOLLINGSWORTH AND HERMAN R. TRAVERS, OF BALTIMORE, MARYLAND.

PEA-SHELLER.

SPECIFICATION forming part of Letters Patent No. 390,125, dated September 25, 1888.

Application filed May 9, 1887. Serial No. 237,518. (No model.)

*To all whom it may concern:*

Be it known that we, WILLIAM HOLLINGSWORTH and HERMAN R. TRAVERS, citizens of the United States, residing at Baltimore, in the State of Maryland, have invented certain new and useful Improvements in Pea-Shellers, of which the following is a specification.

Our invention relates to an improved pea-sheller for removing and separating the green peas from their shells.

The invention is illustrated in the accompanying drawings, in which—

Figure 1 is an end elevation of the machine; Fig. 2, a vertical longitudinal section of same. Fig. 3 is a detail view of the rubber tip. Fig. 4 is an enlarged sectional detail view of one of the tip-holding plates and rubber tips secured thereto.

The letter A designates the frame of the machine; B, a horizontal shaft turning in bearings $a$; and $b$, a driven pulley on the said shaft, to which motion is to be imparted. The horizontal shaft B carries at one end a disk, C, which turns in a vertical plane. This disk has a central concavity, $c$, and on the surface around the concavity are secured thin plates $d$, which hold detachable rubber nipples $e$. The nipples must be soft and elastic, and to this end may be made of solid rubber or any compound or material possessing like properties. The nipples $e$ are rounded and shaped like a teat and have a broad flaring head, $e'$, as shown in Figs. 3 and 4.

The nipple-holding plate $d$ is provided with holes $f$, corresponding in shape to the flaring heads $e'$ of said nipples. The nipple passes through the small part of the hole on the face of the plate $d$, while the flaring heads $e'$ are seated in the correspondingly-shaped opening of the plate $d$. These plates are segment-shaped and six of them are on the disk C, as indicated by broken lines in Fig. 1. The holes $f$ in the holding-plates $d$ are first filled with rubber nipples, which are placed in loosely, the broad heads $e'$ of all the nipples being on the back surface of the plate. The back surface of the plate and the heads of the nipples are then placed against and in contact with the surface of the disk C, and said holding-plates $d$ are suitably secured to the disk by screws or otherwise. By this construction of holding plate and detachable rubber nipples, which latter comprise the working parts in the operation of hulling peas, the machine may be kept in repair and good order at little cost.

A stationary vertical disk, C', confronts a vertical revoluble disk, C, mounted on the shaft B, and is sustained in position by the three radial arms $g$, which are bolted to the frame A, around one of the bearings $a$, and project beyond the revoluble disk. A bolt, $h$, connects each arm $g$ with the stationary disk C'. The stationary disk C' is provided with rubber nipples and holding-plates, the same as the revoluble disk. The rubber nipples on each disk are arranged or located in any desired way; but it is preferred that one feature of location be observed—to wit, that the nipples on both disks be in circles concentric with the axis of the revoluble disk, and that the circles on one disk have different diameters from those on the other, so that the nipples on the revoluble disk will have a path of rotation between the nipples on the stationary disk.

A peripheral guard case or shell, D, is attached to the stationary disk and overlaps the revoluble disk. This case is for the most part circular, but its lowermost portion is funnel-shaped, as at $i$, and the depending funnel-shaped part inclines laterally, as shown in Fig. 2.

The vertical stationary disk C' has a central opening, $k$, confronting the concavity $c$ in the other disk, and a chute or funnel, E, is bolted to the disk around the two vertical sides and bottom of said opening. The pea-pods to be hulled are placed in the funnel E and feed down against the concavity $c$ and pass between the two disks, where they are subjected to the action of the rubber nipple $e$, which opens the pods and liberates the peas, and both the peas and empty pods pass down into the guard-funnel $i$, the lateral inclination of which directs them into the separator F.

The shaft B, on which the revoluble disk C is mounted, is adjustable endwise in its bearings $a$, so as to have the space between two disks more or less; in other words, so as to bring the two disks closer together or farther apart, to suit the size and character of the peas. The shaft B is turned down or reduced in size at $l$, and a collar, *m*, is fitted thereon. An adjusting screw, *n*, has one end fixed in the frame and passes loosely through a hole in the said collar, and two adjusting-nuts, *o*, are on the screw, one each side of the collar. By shifting these nuts the collar may be shifted, and thereby both the shaft B and disk C adjusted.

We attach importance to the fact that the nipples in our device being made of solid elastic material allows the same not only a yielding but also a springing action, whereas the rubber covering for metallic teeth will only afford a yielding surface to prevent injury to the product. We further attach importance to the fact that the nipples or teeth in our device, being made of solid elastic material, do not rust, as is the case with metallic teeth or metallic rubber-covered teeth.

From the foregoing description the operation will be readily understood.

Having described our invention, we claim and desire to secure by Letters Patent of the United States—

1. The combination of the disks C C', the plates *d*, secured thereon and having openings therein, and the solid elastic nipples having flaring heads seated in said openings, corresponding in shape to the flaring heads, said nipples adapted to have a yielding and springing motion, substantially as described.

2. In a pea-sheller, the combination, with the frame A and an endwise-adjustable shaft mounted on said frame, of the disks C C', the plates *d*, secured to said disks and having openings therein, and the solid elastic nipples with flaring heads seated in said openings corresponding in shape to the flaring heads of said nipples, substantially as shown and described, and for the purpose set forth.

In testimony whereof we affix our signatures in the presence of two witnesses.

WILLIAM HOLLINGSWORTH.
HERMAN R. TRAVERS.

Witnesses:
JOHN E. MORRIS,
JNO. T. MADDOX.